United States Patent
Song et al.

(10) Patent No.: US 9,360,745 B2
(45) Date of Patent: Jun. 7, 2016

(54) LIGHT SOURCE ASSEMBLY AND PROJECTOR HAVING THE SAME

(75) Inventors: Kihyuk Song, Gyeonggi-Do (KR); Kiso Bok, Seoul (KR); Honglyeol Oh, Seoul (KR); Dohyun Koo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1219 days.

(21) Appl. No.: 13/311,221

(22) Filed: Dec. 5, 2011

(65) Prior Publication Data

US 2012/0257171 A1 Oct. 11, 2012

(30) Foreign Application Priority Data

Apr. 11, 2011 (KR) .......................... 10-2011-0033463
May 3, 2011 (KR) .......................... 10-2011-0042152

(51) Int. Cl.
*G03B 21/16* (2006.01)
*G03B 21/20* (2006.01)
*G03B 21/14* (2006.01)

(52) U.S. Cl.
CPC ............ *G03B 21/2013* (2013.01); *G03B 21/16* (2013.01); *G03B 21/2033* (2013.01); *G03B 21/145* (2013.01)

(58) Field of Classification Search
CPC ..... G03B 21/16; G03B 21/2033; G03B 1/145
USPC .................................. 353/20, 10, 52; 362/235
See application file for complete search history.

(56) References Cited

U.S. PATENT DOCUMENTS

| 6,988,815 B1 * | 1/2006 | Rizkin et al. .................. 362/245 |
| 2011/0013144 A1 * | 1/2011 | Silverstein et al. ............... 353/8 |

* cited by examiner

*Primary Examiner* — William C Dowling
*Assistant Examiner* — Jerry Brooks
(74) *Attorney, Agent, or Firm* — Birch, Stewart, Kolasch & Birch, LLP

(57) ABSTRACT

A light source assembly includes a plurality of first light sources disposed on a first plane to emit light, a plurality of second light sources disposed on a second plane, the second plane spaced apart from the first plane with a preset interval, wherein each second light source emits light between the adjacent first light sources, and a lens configured to concentrate light emitted from the plurality of first and second light sources. A projector having the light source assembly is also provided.

18 Claims, 12 Drawing Sheets

LIGHT SOURCE ASSEMBLY AND PROJECTOR HAVING THE SAME

CROSS-REFERENCE TO RELATED APPLICATION

Pursuant to 35 U.S.0 §119, this application claims the benefit of earlier filing date and right of priority to Korean Application Nos. 10-2011-0033463 and 10-2011-0042152, filed in Republic of Korea on Apr. 11, 2011 and May 3, 2011, respectively, the contents of which are incorporated by reference herein in their entireties.

BACKGROUND OF THE INVENTION

1. Field of the Invention

This specification relates to a light source assembly with light sources and a projector having the same.

2. Background of the Invention

As an information age rapidly develops, the importance of display devices implementing a large screen are emphasized. One example of the device implementing such large screen is a projector having an extended projection function for images.

In recent time, as the performance of the projector is held in great importance, a variety of new attempts are applied in view of hardware or software configuration. As one example, an attempt has been made to realize a projector using a laser diode (LD), a light emitting diode (LED), an organic LEG (OLED), a fluorescent substance and the like as a light source.

A light source may be provided in plurality at appropriate positions, and light emitted from them may be concentrated (condensed, collected) onto one spot (point), thereby implementing a light source with high luminance (brightness).

For example, the laser diode (LD) is configured to emit coherent light with predetermined wavelengths, namely, laser beams, through stimulated emission and constructive interference when voltage is applied to both ends. Laser beams emitted from a plurality of LDs are concentrated through a lens, thereby realizing a light source with high luminance.

For constructing a light source with higher luminance, since more light sources are required and they should be disposed within a limited space, there is a technical problem in designing such light source. As an approach to design a light source with high luminance, structural variation and development of a light source assembly may be concerned.

Also, such light source with high luminance exhibits a behavior sensitive to temperature. Therefore, an approach to cool light sources such as the LD more efficiently may be concerned.

SUMMARY OF THE INVENTION

Therefore, an aspect of the detailed description is to provide a light source assembly with higher luminance and a projector having the same.

Another aspect of the detailed description is to provide a light source assembly, which exhibits energy uniformity and is capable of easily controlling polarized light, and a projector having the same.

Another aspect of the detailed description is to provide a cooling apparatus enabling more uniform temperature distribution of light sources, and a projector having the same.

To achieve these and other advantages and in accordance with the purpose of this specification, as embodied and broadly described herein, there is provided a light source assembly including a plurality of first light sources disposed on a first plane to emit light, a plurality of second light sources disposed on a second plane, the second plane spaced apart from the first plane with a preset interval, wherein each second light source emits light between the adjacent first light source, and a lens configured to concentrate light emitted from the plurality of first and second light sources.

In accordance with another exemplary embodiment of the present disclosure, there is provided a light source assembly including first and second bodies disposed to face each other, first light sources mounted onto the first body along a plurality of first lines, second light sources mounted onto the second body along second lines overlapping the first lines, the second light sources emitting light between the first light sources, and a heat transfer unit inserted into at least one of the first and second bodies and disposed between at least one of the first and second lines, to transfer heat generated from at least one of the first and second light sources.

To achieve these and other advantages and in accordance with the purpose of this specification, as embodied and broadly described herein, there is provided a projector including a light source assembly configured to transfer heat generated from a plurality of light sources, an image generator configured to form an image using light incident from the light sources, and a projection lens configured to project an image output from the image generator in an extended state.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
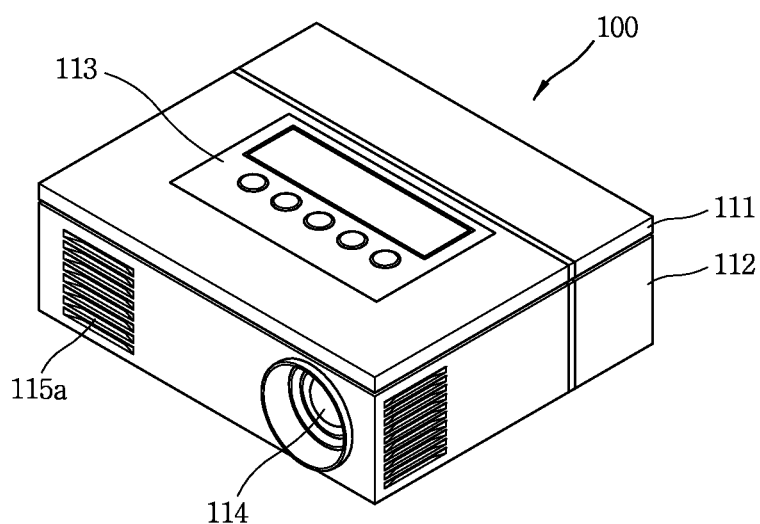
FIG. 1 is a front perspective view of a projector in accordance with this specification.

Description will now be given in detail of a mobile terminal with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

FIG. 1 is a front perspective view of a projector 100 in accordance with the present disclosure.

All of the elements as shown in FIG. 1 are not necessarily required, and the projector 100 may be implemented with greater or less number of elements than those shown elements.

An appearance of the projector 100 may be defined by upper and lower cases 111 and 112. Various optical elements and electronic elements may be mounted in a space formed by the upper and lower cases 111 and 112. At least one intermediate case may further be disposed between the upper and lower cases 111 and 112.

The upper case 111 may include a manipulating unit 113. The manipulating unit 113 may employ any method if it is implemented in a tactile manner allowing the user to perform manipulation with a tactile feeling.

The manipulating unit 113 may receive commands for control of operations of the projector 100. From the functional perspective, the manipulating unit 113 may be used to input menus, such as start, end and the like.

Also, the manipulating unit 113 may be manipulated to zoom in or zoom out an image projected by the projector 100. The manipulating unit 113 may be manipulated for focusing on an image projected by the projector 100.

The lower case 112 may include a projection lens 114, a first air flowing unit 115a and the like.

The projection lens 114 may be configured to enlarge (extend) an image projected by the projector 100. The projection lens 114, for example, may be implemented as a lens group including extended projection lenses disposed with predetermined intervals. The extended projection lenses of the projection lens 114 may be disposed with intervals adjustable by manipulation of the manipulating unit 113, thereby allowing for a zooming or focusing function of the projector 100.

The first air flowing unit 115a may be provided with a plurality of through holes so as to allow air to flow into the projector 100, which enables the projector 100 to be cooled using forced convection.

Figure 2:
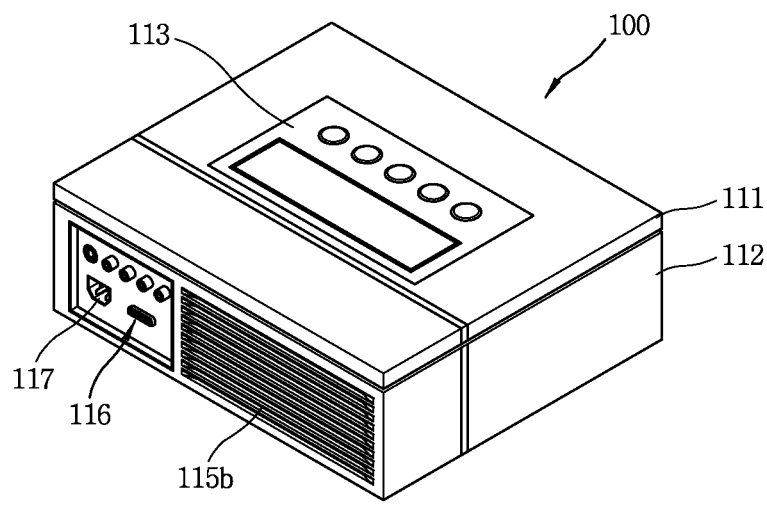
FIG. 2 is a rear perspective view of the projector of FIG. 1.

FIG. 2 is a rear perspective view of the projector 100 shown in FIG. 1.

The lower case 112 is shown having a second air flowing unit 115b, an interface 116, a power supply unit 117 and the like.

The second air flowing unit 115b may be provided with a plurality of through holes, similar to the first air flowing unit 115a (see FIG. 1), so as to allow air to flow into the projector 100.

The interface 116 may serve as a path for data exchange and the like between the projector 100 and an external device. The interface 116 may allow image data, which corresponds to an image to be projected by the projector 100, to be input from the outside. Referring to FIG. 2, the interface 116 may include a connection terminal electrically connectable to electronic devices, for example, a computer, a DVD player and the like, which can provide image or voice data.

The power supply unit 117 may be mounted into the power case 112 for power supply to the projector 100. The power supply unit 117, for example, may be configured to receive domestic power which provides alternating current (AC) and convert the AC power into direct current (DC) power. Here, the power supply unit 117 may not be limited to the structure. Alternatively, the power supply unit 117 may be a rechargeable battery which may be detachable for charging.

One of the upper and lower cases 111 and 112 may include an audio output module as a speaker, and further include a broadcast signal receiving antenna and the like.

Figure 3:
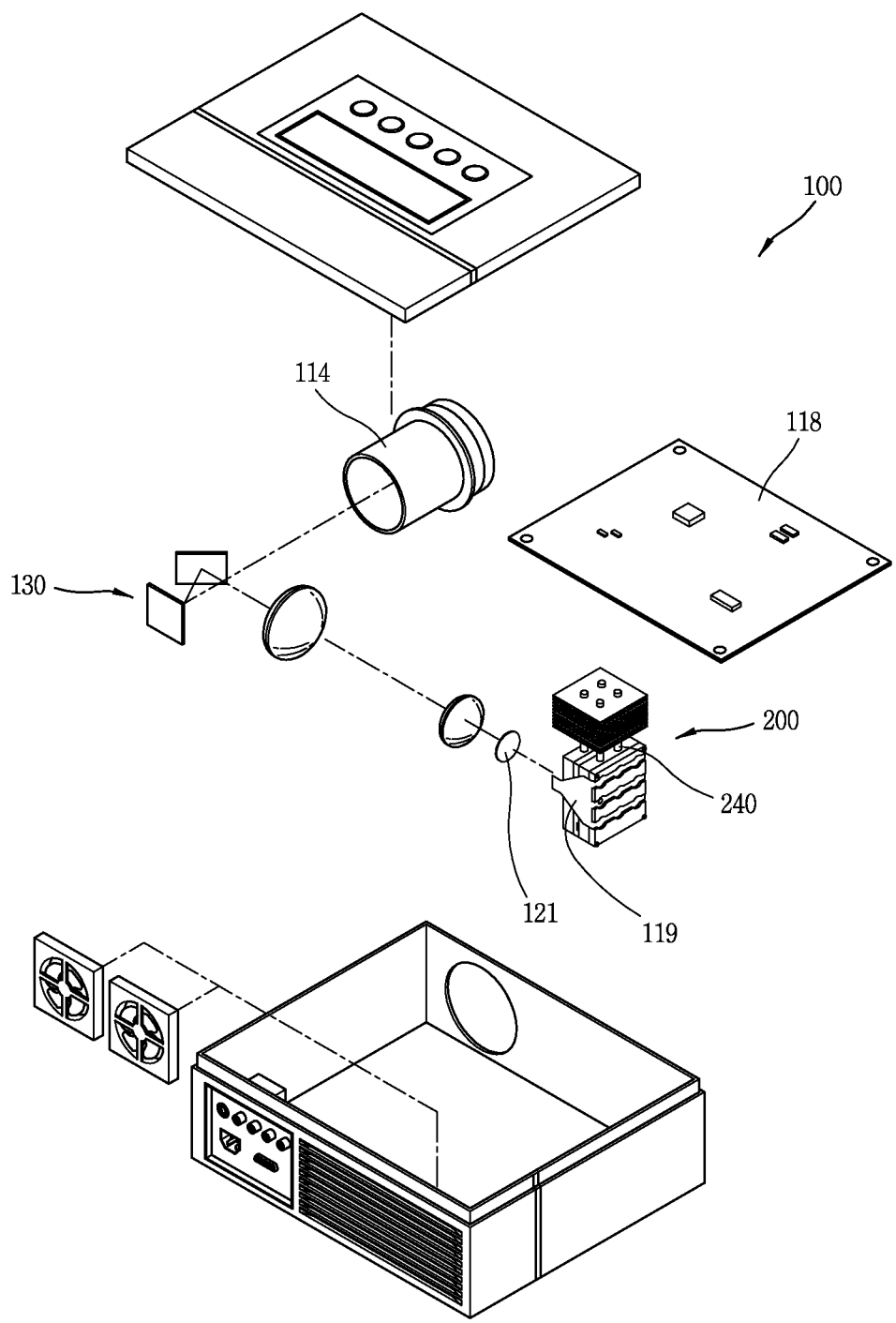
FIG. 3 is a disassembled view of the projector of FIG. 1.
Figure 4:
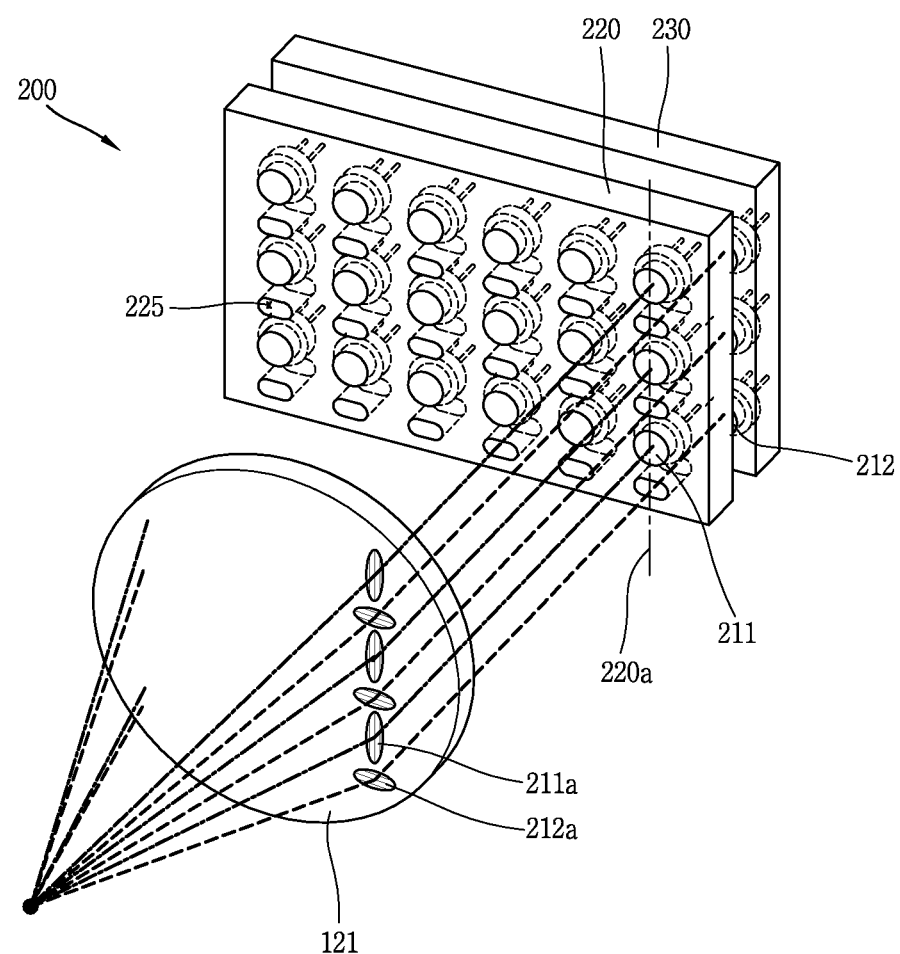
FIG. 4 is an overview showing a concept that light is collected (concentrated) in a light source assembly of FIG. 3.

FIG. 3 is a disassembled view of the projector 100 of FIG. 1, and FIG. 4 is an overview showing a concept that light is collected (concentrated) in a light source assembly 200 of FIG. 3.

As shown in FIG. 3, the projector 100 may include a light source assembly 200, an image converter 130 and a projection lens 114.

The light source assembly 200 indicates a light source device having more light sources 211 and 212 integrated within a limited space and making heat of the light sources 211 and 212 transferred so as to have higher luminance. Each of the light sources 211 and 212 may be a laser diode (LD), a light emitting diode (LED), an organic LED (OLED), a florescent substance and the like.

The image converter 130 may generate (form) an image using light emitted from the light source assembly 200. For example, the image converter 130 may be an optical system, which carries out a color conversion or color separation with respect to light generated from the light sources 211 and 212 and converts such light into an image using a display device. An image output from the image converter 130 may be projected onto a screen through the projection lens 114 in an extended (enlarged) state.

Referring to FIG. 4, the light source assembly 200 may condense (concentrate, collect) light using a plurality of first light sources 211, a plurality of second light sources 212 and a lens 121.

Those elements may be disposed in the order of the lens 121, the first light sources 211 and the second light sources 212.

The first and second light sources 211 and 212 may emit light toward the lens 121. Examples of the first and second light sources 211 and 212 may include a laser diode (LD), a light emitting diode (LED), an organic LED (OLED), a florescent substance and the like.

In this exemplary embodiment, the first and second light sources 211 and 212 may be implemented as LDs which generate laser beams using a forward semiconductor junction as an active medium. In detail, when applying voltage to both ends, the first and second light sources 211 and 212 may emit coherent light having predetermined wavelengths, namely, laser beams through stimulated emission and constructive interference.

Each of the first and second light sources 211 and 212 may be configured to emit light (i.e., polarized light) having a predetermined direction of an electric field on a plane perpendicular to a light emitting direction. For example, the plurality of first and second light sources 211 and 212 may be configured to emit polarized light 211a in a first direction and polarized light 212a in a second direction intersecting with the first direction, respectively. The second direction may be perpendicular to the first direction.

The plurality of first and second light sources 211 and 212 may be aligned in a horizontal direction or a perpendicular direction in the drawing on the respective planes.

Hereinafter, description will be given of an exemplary case where the polarized light 211a in the first direction is P wave and the polarized light 212a in the second direction is S wave or vice versa.

The plurality of first light sources 211 may be disposed on a first plane. The plurality of first light sources 211 may include first light source columns each having a (a is a natural number more than 2) first light sources 211, and first light source rows each having b (b is a natural number more than 2) first light sources 211. That is, the plurality of first light sources 211 may be aligned on the first plane in a matrix configuration.

The plurality of second light sources 212 may be disposed on a second plane, which is spaced apart from the first plane with a preset interval. For example, the second plane may be disposed in parallel to a rear surface of the first plane with the preset interval therebetween. Each of the plurality of second light sources 212 may be disposed to emit light between the adjacent first light sources 211. The plurality of second light sources 212 may include second light source columns each having c (c is a natural number more than 2) second light sources 212, and second light source rows each having d (d is a natural number more than 2) second light sources 212. That is, the plurality of second light sources 212 may be aligned on the second plane in a matrix configuration. The second light source row may overlap the first light source row and the second light source column may be present between the first light source columns.

In order to realize the alignment of the light sources 211 and 212, the light source assembly 200 may include, but not limited to, first and second bodies 220 and 230 facing each other. Alternatively, the alignment of the light sources 211 and 212 may be implemented without the first and second bodies 220 and 230. For example, the first and second bodies 220 and 230 may be configured as a single body, or be other structures within the projector.

The plurality of first light sources 211 may be mounted onto the first body 220 along a plurality of first lines 220a (i.e., first light source rows), and the plurality of second light sources 212 may be mounted onto the second body 230 along second lines 230a (see FIG. 9) (i.e., second light source row) overlapping the first lines 220a.

The lens 121 may concentrate light emitted from each of the first and second light sources 211 and 212. The lens 121 may be a convex lens whose center is thicker than a periphery. The lens 121 may concentrate light emitted from each of the first and second light sources 211 and 212 onto one spot, thereby increasing brightness of the light.

Light emitted from the second light sources 212 may be present between pitches of light emitted from the first light sources 211 on an incident surface of the lens 121. For example, P waves and S waves emitted from the first and second lines 220a and 230a, respectively, may be alternately present on the incident surface of the lens 121.

For such presence, the plurality of second light sources 212 may be alternately present between the plurality of first light sources 211 when being projected onto the first plane. With the structure, light emitted from the second light sources 212 may be emitted to spaces between the plurality of first light sources 211. So, through holes 225 may be formed through the first body 220 such that the light emitted from the plurality of second light sources 212 can pass therethrough.

As aforementioned, the first and second light sources 211 and 212 disposed on the first and second light source columns or rows, respectively, may be alternately aligned on the same plane. Or, the second light sources 212 may be disposed to be surrounded by the first light source columns and rows.

With the structure, more light emitting elements can be integrated within a limited space, and the light source assembly 200 can be implemented to have higher luminance. Also, the combination of P wave and S wave arouses improvement of energy uniformity, thereby providing light sources with better qualities.

Referring back to FIG. 3, the projector 100 may include a controller for controlling overall operations of the first and second light sources 211 and 212. The controller may be a circuit board 118, which is mounted in the projector 100 in a hardware configuration and connected to the light source assembly 200 via a flexible circuit board 119.

The controller may control power to be individually supplied to or blocked from the first and second light sources 211 and 212, such that one polarized light of P wave or S wave can be emitted from the first and second light sources 211 and 212, which may allow for implementation of a three-dimensional (3D) display without a separate polarizing element (polarizer) (for example, retarder).

FIG. 4 shows that the first light sources 211 are disposed to emit polarized light 211a in the same direction. However, according to a different method, each of the first light sources 211 may be rotated by a predetermined angle (for example, 15° so as to obtain circularly polarized light. That is, if the first light sources 211 are arranged on the first body 220, which will be explained later, with rotating by 15° intervals, 24 light sources may be installed and emitted light may be combined to be output as circularly polarized light.

The circularly polarized light may be applicable to a liquid crystal shutter glass type 3D display.

Hereinafter, the structure will be described in more detail.

Figure 5:
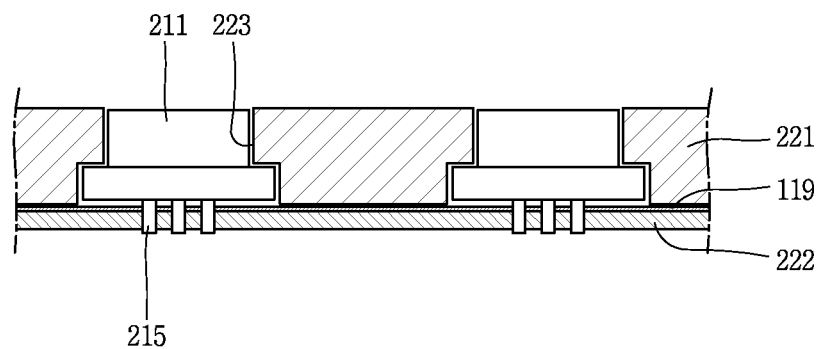
FIG. 5 is a sectional view showing that a plurality of first light sources are coupled to a first body shown in FIG. 4.

FIG. 5 is a sectional view showing a coupled state of the first light sources 211 onto the first body 220 shown in FIG. 4.

As shown in FIG. 5, the first body 220 may include a first housing 221 and a first cover 222. The structure may be applicable to the second body 230 (see FIG. 4) as well.

The first housing 221 may be disposed on the first plane and include a plurality of first accommodating recesses 223 for accommodation of the plurality of first light sources 211, respectively. The second body 230 may be disposed on the second plane and include a plurality of second accommodating recesses (not shown) for accommodation of the plurality of second light sources 212, respectively.

The first light sources 211 are inserted into the first accommodating recesses 223 and the first cover 222 is coupled to the first housing 221 to obscure the first light sources 211, thereby obviating separation of the first light sources 211. A flexible circuit board 119 connected to a power supply unit (not shown) may be mounted onto the first cover 222. The flexible circuit board 119 may be connected to lead wires 215 to supply power to each of the plurality of first light sources 211.

The flexible circuit board 119 may be electrically connected to the controller, accordingly those light sources can be controlled.

Figure 6:
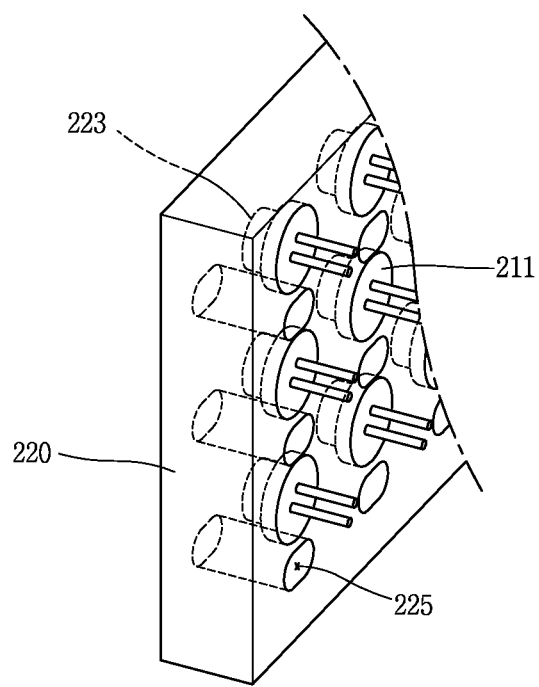
FIG. 6 is an enlarged view showing through holes formed at the first body such that light emitted from the second light sources of FIG. 4 can pass through the first body.

FIG. 6 is an enlarged view showing that the through holes 225 are formed through the first body 220 such that light emitted from the second light sources 212 of FIG. 4 can penetrate the first body 220.

Referring to FIG. 6 together with FIG. 4, the second body 230 may be disposed behind the first body 220, and the second light sources 212 mounted onto the second body 230 may emit light toward the lens 121. Therefore, the light should pass through the first body 220 to reach the lens 121.

The through holes 225 may allow the light emitted from the second light sources 212 to go through. For example, the through holes 225 may be formed between the plurality of first accommodating recesses 223 based on the first light source rows or columns of the first body 220. As the through holes 225 are formed, the light, for example, S waves, emitted from the second light sources 212 disposed behind the first body 220 can reach the lens 121.

The first body 220 may be made of a light-shielding material which adsorbs light and restricts light leakage. As the first body 220 is made of the light-shielding material, among S waves, some light which have failed to pass through the through holes 225 may be filtered out, and accordingly the light source assembly can be implemented to emit light with more organized uniform energy.

Figure 7:
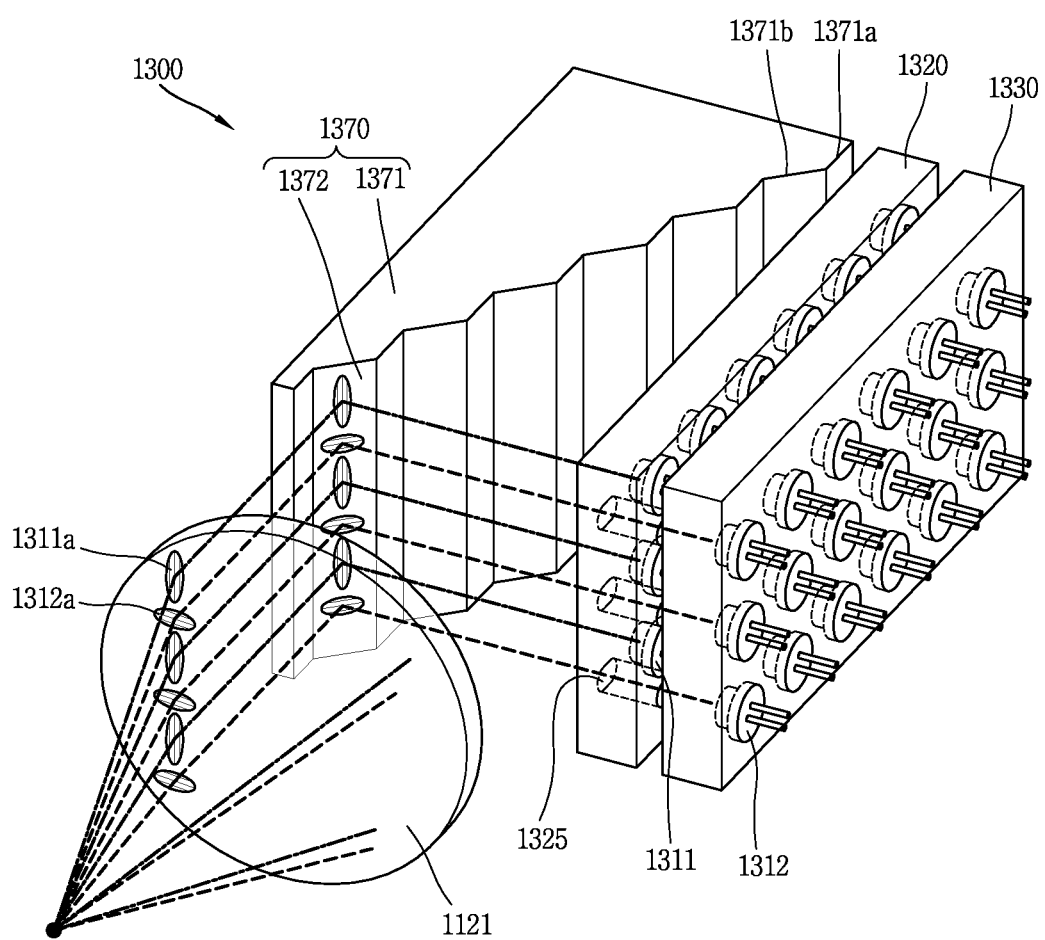
FIG. 7 is a perspective view showing another exemplary embodiment of a light source assembly.
Figure 8:
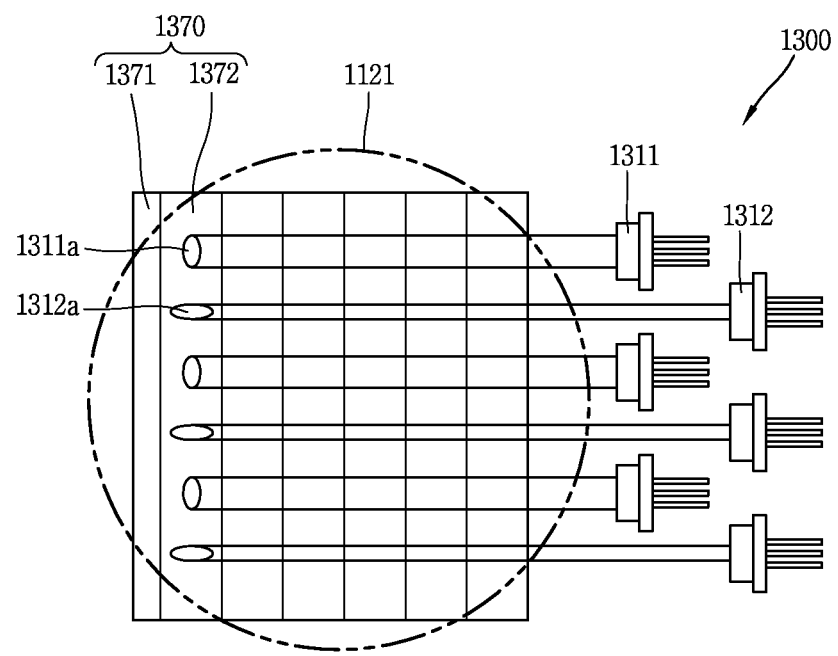
FIG. 8 is a front view of the light source assembly of FIG. 7.

FIG. 7 is a perspective view showing another exemplary embodiment of a light source assembly 1300, and FIG. 8 is a front view of the light source assembly 1300 of FIG. 7.

As shown in FIGS. 7 and 8, the light source assembly 1300 according to the another exemplary embodiment has the same configuration as the light source assembly 200 excluding a light guide unit 1370. Hereinafter, description will be given, focusing on the light guide unit 1370, which converts a path of light emitted from each of first and second light sources 1311 and 1312.

The light guide unit 1370 may be disposed on the path of light emitted from each of the first and second light sources 1311 and 1312, and convert the light path so as to guide the light to the lens 1121. For example, polarized light 1311a and 1312a in first and second directions are emitted from the respective first and second light sources 1311 and 1312 in parallel to an incident surface of the lens 1121 and then reflected by the light guide unit 1370 so as to perpendicularly reach the incident surface of the lens 1121.

The light guide unit 1370 may include a reflection layer 1372 inclined from the first plane by a preset angle. The reflection layer 1372 may be in form of one wide panel so as to reflect all of light emitted from the plurality of first and second light sources 1311 and 1312.

Alternatively, the light guide unit 1370 may be in form of stair steps. In this structure, the light guide unit 1370 may include a base 1371 and reflection layers 1372.

The base 1371 may be in form of stair steps by alternately forming parallel surfaces 1371a each present in parallel to the first plane, and incline surfaces 1371b each inclined from the first plane by a preset angle. The base 1371 may be made of polycarbonate (PC) or polyethylene terephthalate (PET), for example.

The reflection layers 1372 may be disposed to obscure the respective incline surfaces 1371b, and guide light emitted from the first and second light sources 1311 and 1312. The reflection layers 1372 may extend in one direction, for example, a direction of first and second light source rows to guide the polarized light 1311a and 1312a in the first and second direction.

The refection layer 1372 may be a coated mirror coated on the incline surface 1371b, or a mirror film attached onto the incline surface 1371b.

With the configuration, upon employing the light guide unit 1370, especially, using the reflection layers 1372 in the stepped form, the first and second light sources 1311 and 1312 can be disposed more efficiently and a diameter of the lens 1121 can be reduced.

Referring back to FIG. 3, the light source assembly 200 has the structure of transferring heat of the light sources. However, without limited to the structure, the light guide assembly 200 may be independently used without a cooling apparatus for transferring heat to the exterior.

In more detail, to transfer heat generated from at least one of the first and second light sources 211 and 212, a heat transfer unit 240 may be inserted into at least one of the first and second bodies 220 and 230, and disposed between at least one of the first lines 220a and the second lines 230a.

Hereinafter, description will be given in more detail of the light source assembly 200 in conjunction with a cooling apparatus for transferring heat.

Figure 9:
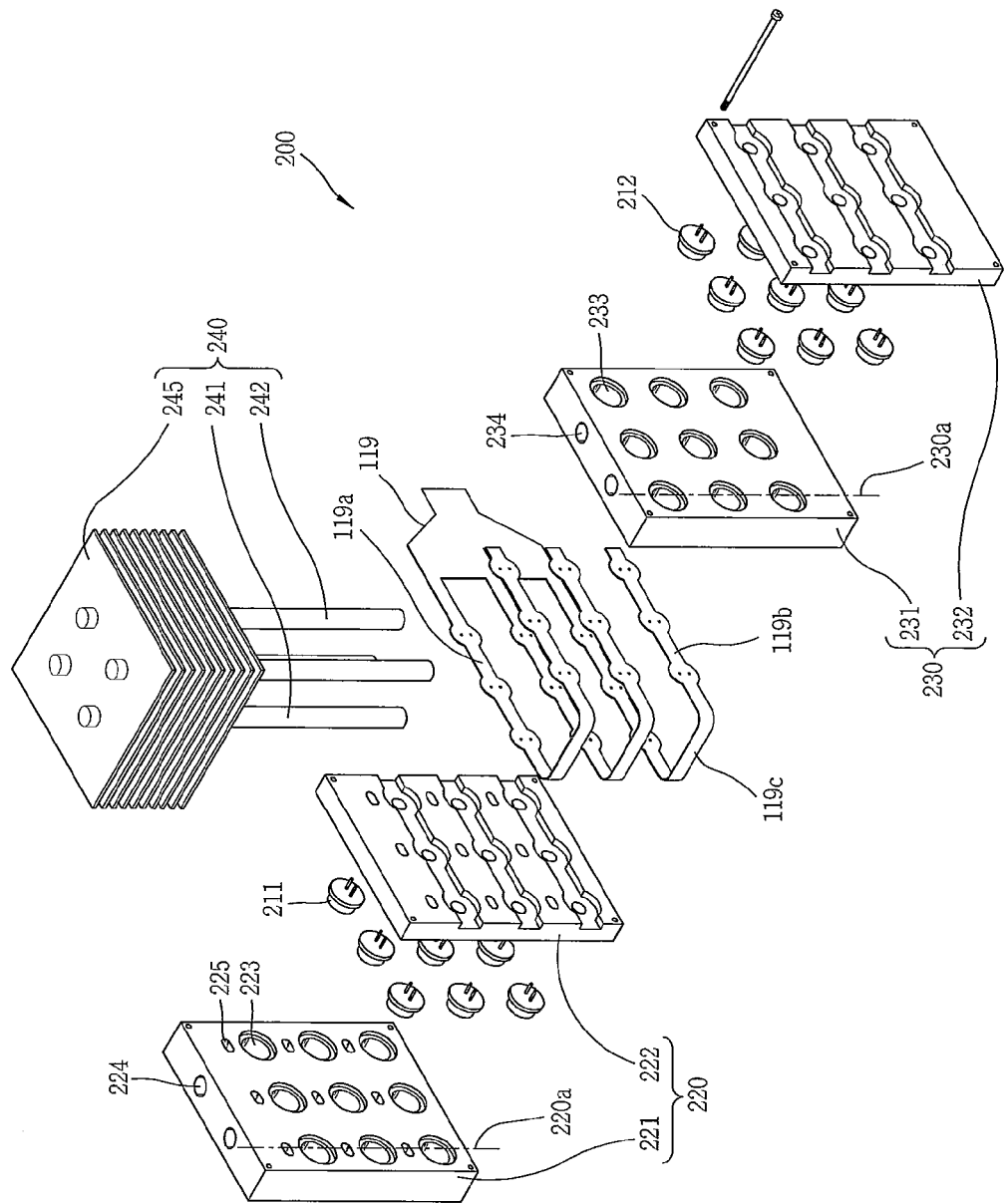
FIG. 9 is a disassembled view of the light source assembly of FIG. 3.
Figure 10:
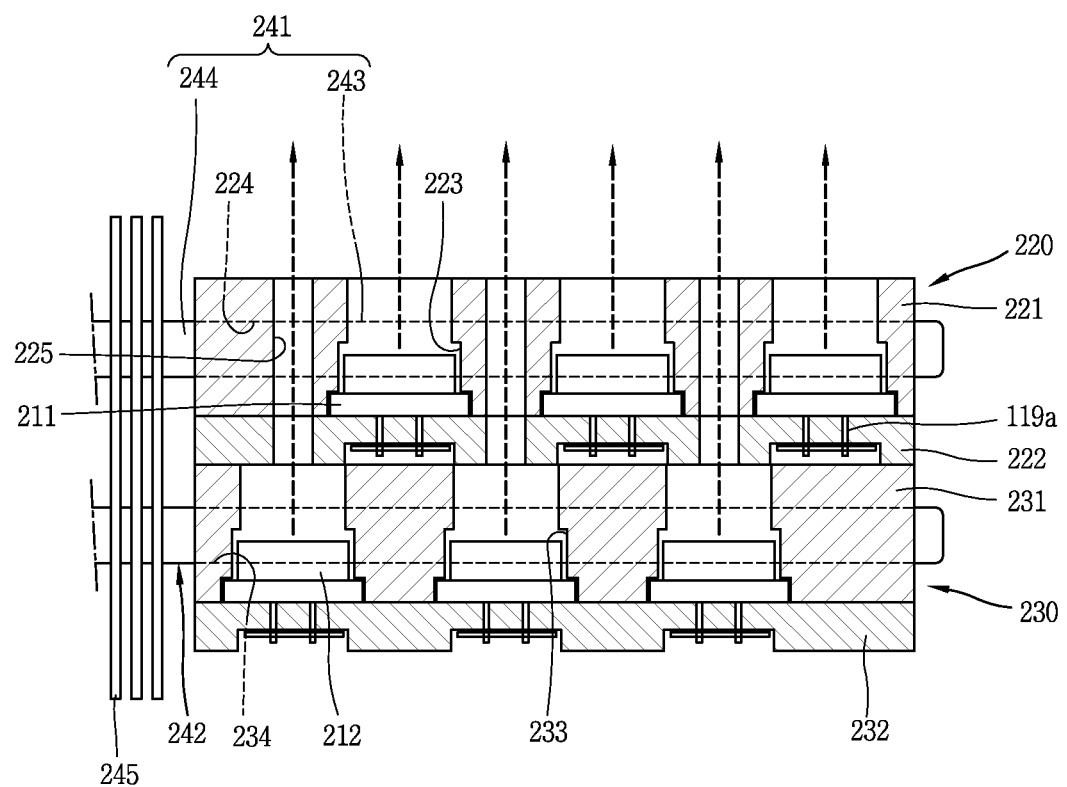
FIG. 10 is a sectional view of the light source assembly of FIG. 3.
Figure 11:
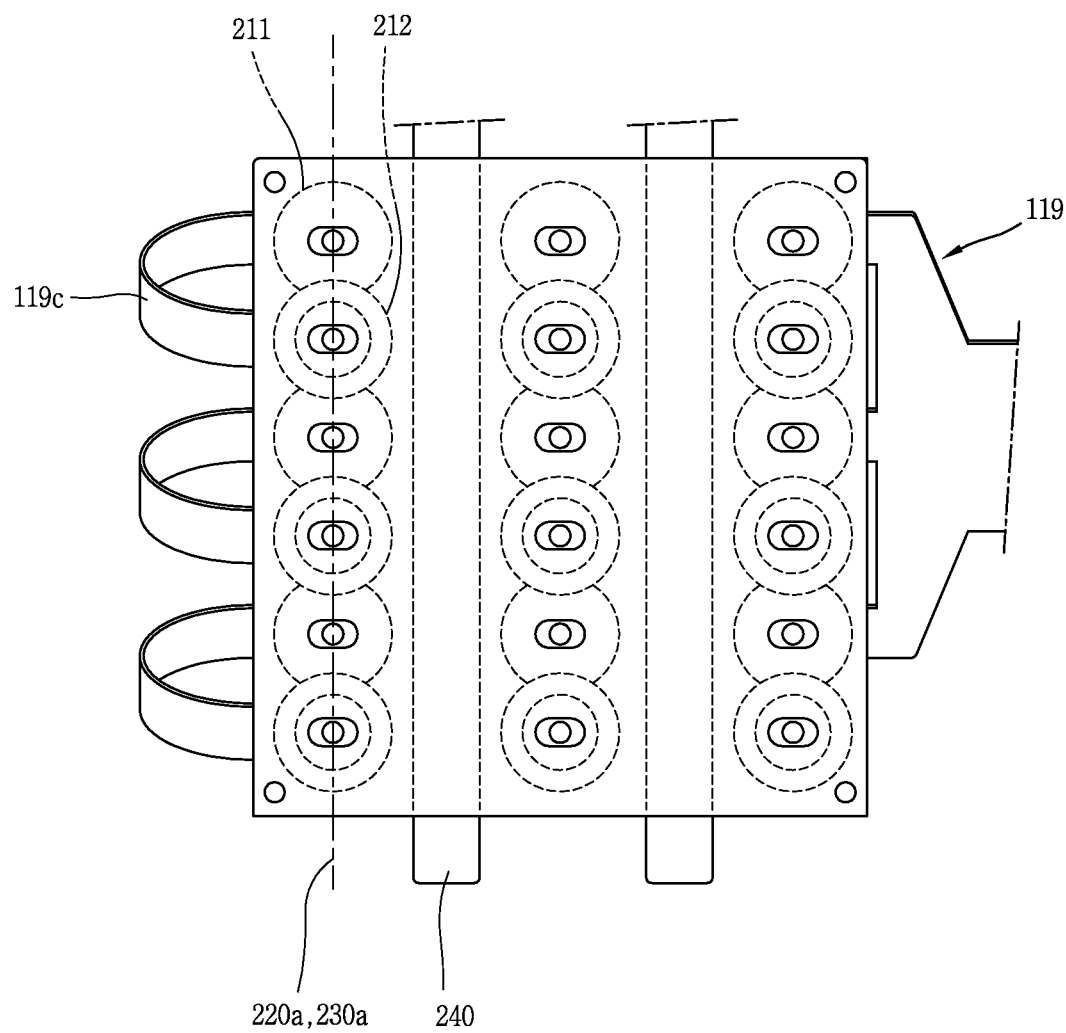
FIG. 11 is a side view of the light source assembly of FIG. 3.

FIG. 9 is a disassembled view of the light source assembly of FIG. 3, FIG. 10 is a sectional view of the light source assembly of FIG. 3, and FIG. 11 is a side view of the light source assembly of FIG. 3.

As shown in FIGS. 9 and 10, the heat transfer unit 240 may include first and second heat transfer members 241 and 242. The heat transfer unit 240 may be, but not limited to, a heat pipe, for example. Alternatively, the heat transfer unit 240 may be made of a material with super thermal conductivity, or be a heat-exchange pipe for circulation of cooling water. When the heat transfer unit 240 is the heat-exchange pipe, a structure of circulating cooling water by a fluid pump may be applied.

Referring to FIGS. 9 and 11, the first heat transfer member 241 may be inserted into the first body 220 to transfer heat generated from the first light sources 211, and disposed between the first lines 220a such that light emitted from the second light sources 212 can go through spaces between the first light sources 211.

The second heat transfer member 242 may be inserted into the second body 230 to transfer heat generated from the second light sources 212. The second heat transfer member 242 may be disposed between the second lines 230a to penetrate between the second light sources 212, thereby overlapping the first heat transfer member 241.

Referring to FIG. 10, in more detail, the heat transfer unit 240 may include an inserted portion 243 and an extending portion 244. The inserted portion 243 is a portion inserted into the body 220, 230, and the extending portion 244 is a portion extending from the inserted portion 243 to the exterior of the body 220, 230.

The inserted portion 243 may be in parallel to at least one of the first and second lines 220a and 230a. Accordingly, the second heat transfer member 242 may be in parallel to the first heat transfer member 241 within the second body 230. Namely, the first heat transfer member 241 may be disposed in parallel to the second heat transfer member 242 within the first body 220.

Referring back to FIGS. 9 and 10, a radiating member 245 may be coupled to the extending portion 244 such that heat can be transferred from the extending portion 244. The radiating member 245 may have a form with a plurality of fins, and define a wide radiation area.

With this structure, the first and second heat transfer members 241 and 242 may penetrate central portions of the first and second bodies 220 and 230, which results in more uniform temperature distribution between the central portion and edge portions of the light guide assembly 200.

More especially, the first body 220 may include a first housing 221 and a first cover 222. Also, the second body 230 may include a second housing 231 and a second cover 232.

The first housing 221 may accommodate the plurality of first light sources 211, and the second housing 231 may accommodate the plurality of second light sources 212. The first and second covers 222 and 232 may obscure the first and second housings 221 and 231, respectively, thereby securing the first and second light sources 211 and 212 and simultaneously cooling rear surfaces of the first and second light sources 211 and 212.

More particularly, the first housing 221 may include first accommodating recesses 223 for accommodation of the first light sources 211, and first insertion holes 224 for insertion of the first heat transfer members 241. The first cover 222 may be mounted to the first housing 221 to obscure the first accommodating recesses 223.

Similarly, the second housing 231 may include second accommodating recesses 233 for accommodation of the second light sources 212, and second insertion holes 234 for insertion of the second heat transfer members 242. The second cover 232 may be mounted to the second housing 231 to obscure the second accommodating recesses 233.

As shown, the second housing 231 may be disposed at a rear side of the first housing 221, and the second light sources 212 mounted onto the second housing 231 may emit light toward the lens 121 (see FIG. 3). Therefore, the light should penetrate the first housing 221 to reach the lens 121.

The through holes 225 may be formed such that light emitted from the second light sources 212 can go therethrough. For example, the through holes 225 may be formed between the first accommodating recesses 223 along the first lines 220a of the first housing 221. Also, the first cover 222 may have through holes corresponding to the through holes 225 such that the light emitted from the second light sources 212 can go therethrough.

The flexible circuit board 119 connected to the power supply unit 117 (see FIG. 3) may be connected to the first and second covers 222 and 232. The flexible circuit board 119 may be connected to lead wires 215 to allow for power supply to each of the first and second light sources 211 and 212.

The flexible circuit board 119 may be electrically connected to the controller (circuit board, see FIG. 3). The controller may control an overall operation of the light source assembly 200.

Referring to FIGS. 9 and 11, the flexible circuit board 119 may intersect with the first and second lines 220a and 230a. In more detail, the flexible circuit board 119 may include a first connecting portion 119a, a second connecting portion 119b and a bent portion 119c.

The first connecting portion 119a may be electrically connected to the first light sources 211, and the second connecting portion 119b may be electrically connected to the second light sources 212. The first connecting portion 119a may be divided into a plurality of strands and the second connecting portion 119b may extend from the plurality of strands.

The bent portion 119c may be a portion bent between the first and second connecting portions 119a and 119b such that the first and second connecting portions 119a and 119b can be connected to each other in an overlapped state. That is, the flexible circuit board 119 may overlap each of the first and second covers 222 and 232 by being bent for the first and second light sources 222 and 232 to be all connected thereto. This structure may make the light source assembly 200 more compact.

Figure 12A:
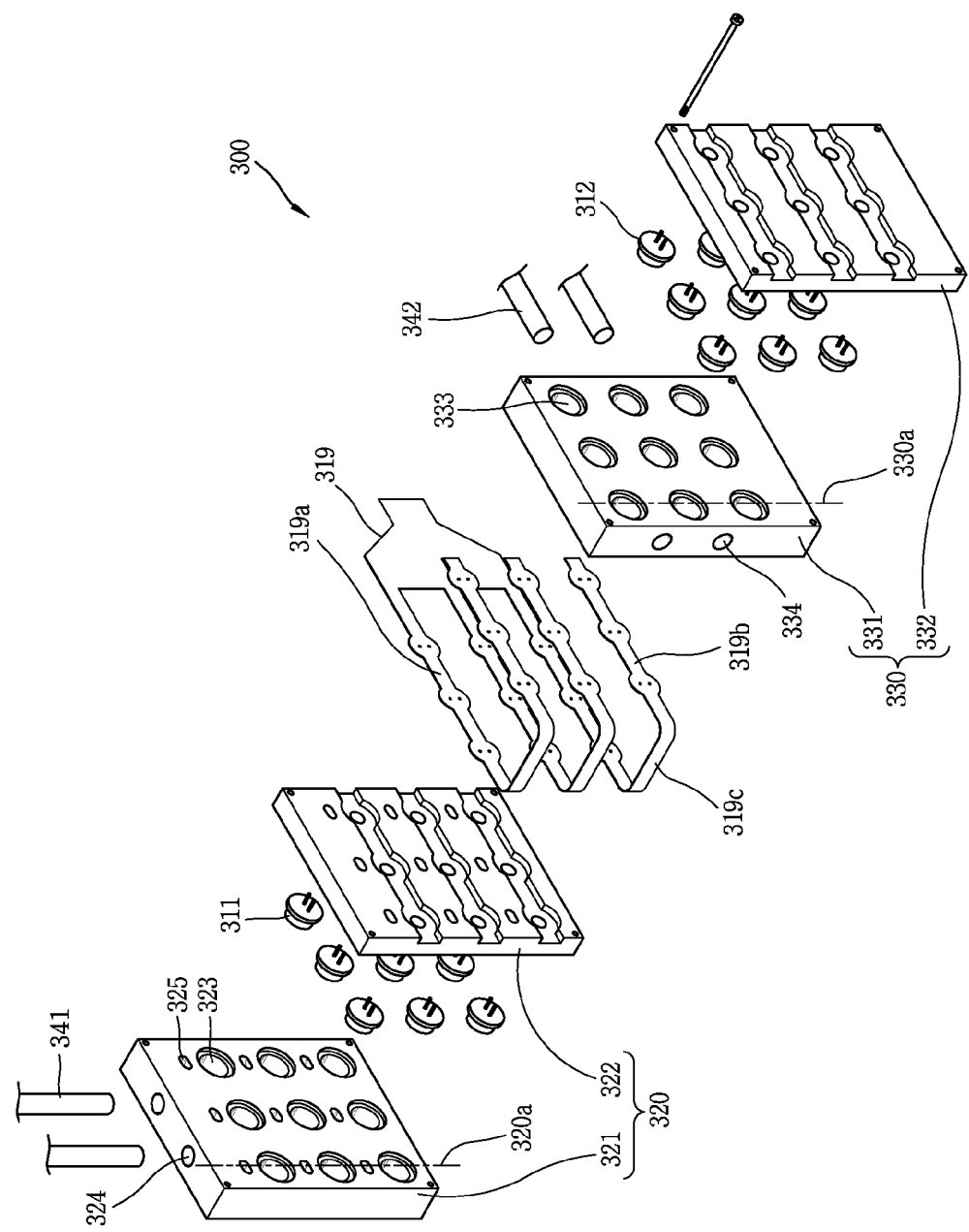
FIGS. 12A and 12B are perspective views showing variations of the light source assembly.
Figure 12B:
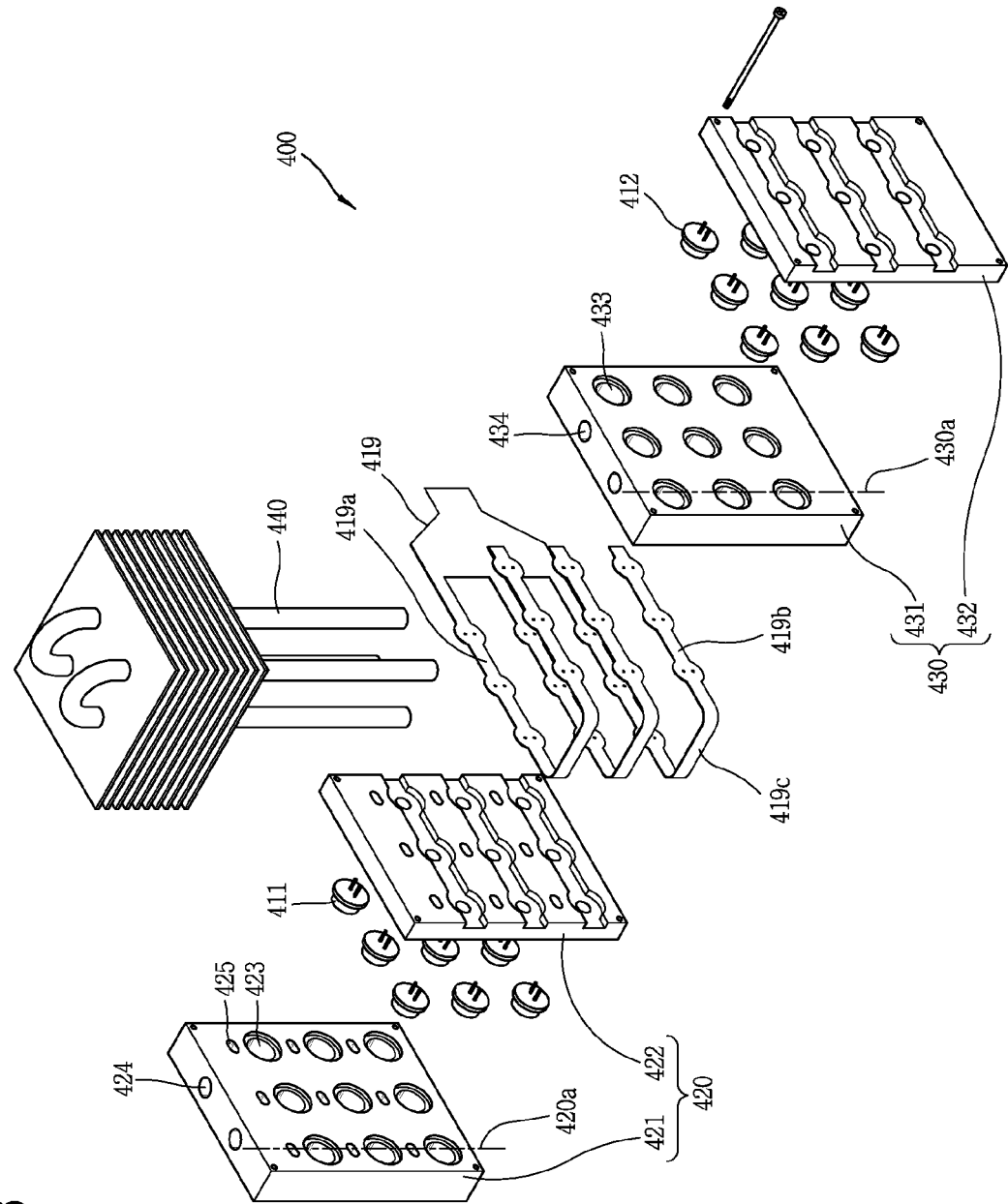

FIGS. 12A and 12B are perspective views showing variations of a light source assembly. Those variations employ like/similar reference numerals for like/similar components to the previous embodiment, and description thereof will be omitted.

Referring to FIG. 12A, first and second heat transfer members 341 and 342 may be disposed perpendicular to each other.

In more detail, the first heat transfer member 341 may be disposed between first lines 320a such that light emitted from second light sources 312 can go through between first light sources 311. However, the second heat transfer member 342 may be disposed to intersect with the second lines 330a (i.e., in parallel to columns) other than along the second lines 330a (i.e., in parallel to rows).

This structure may allow for more uniform heat distribution not only at right and left sides of the light source assembly 300 but also at upper and lower sides thereof.

Referring to FIG. 12B, a heat transfer unit 440 may extend from a first body 420 and be bent to be inserted into a second body 430. For example, the heat transfer unit 440 may be implemented as a heat pipe bent into a shape like "U" so as to penetrate the first and second bodies 420 and 430, respectively. This structure allows fabricating of a light source assembly 400 with lower fabricating cost.

Figure 13:
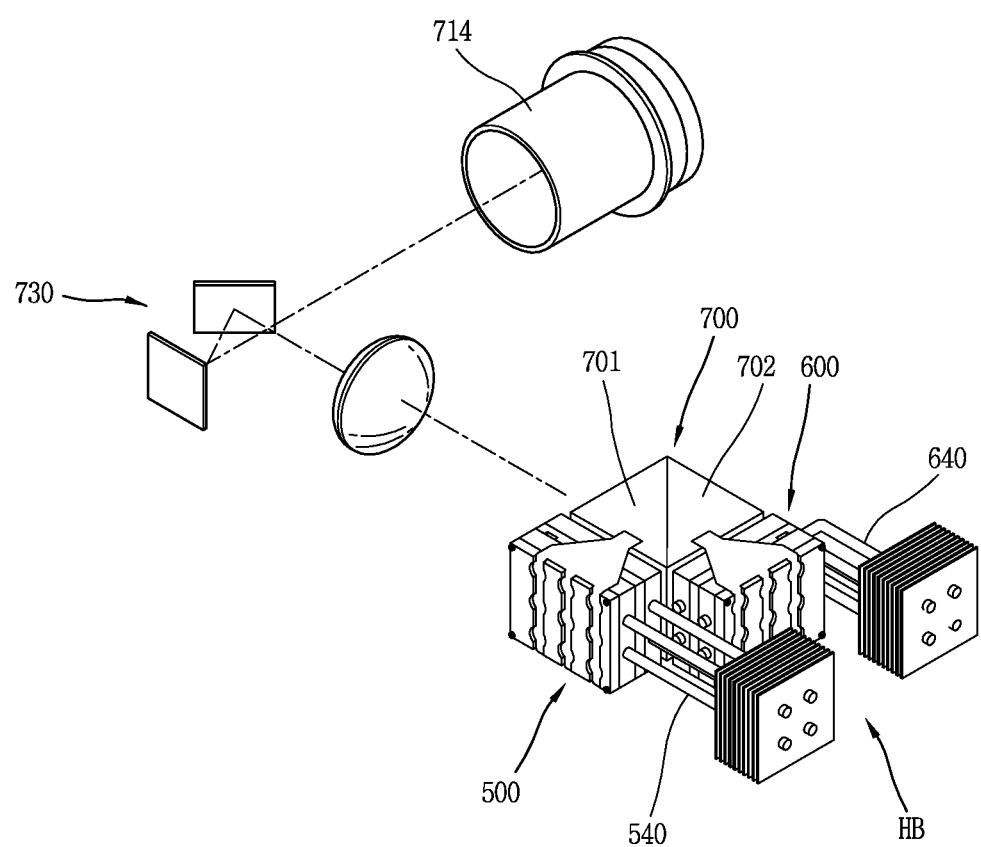
FIG. 13 is a perspective view showing another exemplary embodiment of a light source assembly.

The aforementioned light source assembly may be applied in various forms upon being applied to a projector. Hereinafter, description will be given of a light source assembly applied in another exemplary form. FIG. 13 is a perspective view showing another exemplary embodiment of a light source assembly.

As shown in FIG. 13, a light source assembly may include a plurality of light source assemblies 500 and 600, and a polarization separator 700 may be disposed between the light source assemblies 500 and 600.

Each of the light source assemblies 500 and 600 may be disposed in form of the light source assembly of FIG. 4 being rotated by 90°. In this structure, heat transfer units 540 and 640 may protrude from side surfaces of the light source assemblies 500 and 600, thereby lowering a height of the projector.

Also, the heat transfer units 540 and 640 may extend from the same point and form one heat block (HB) at the corresponding point. Upon cooling only the heat block, the light source assembly can be cooled, thereby realizing more compact cooling apparatus.

One of the light source assemblies 500 and 600 may emit P waves and the other may emit S waves. The light source assemblies 500 and 600 may be disposed orthogonal to each other.

The polarization separator 700 may be disposed such that P waves and S waves can be incident thereon, and configured to reflect one of the incident P waves and S waves and transmit the other such that the incident P and S waves can go along the same light path. The polarization separator 700 may be a polarizing beam splitter (PBS), for example.

In more detail, the polarization separator 700 may include rectangular prisms 701 and 702. The rectangular prisms 701 and 702 may be disposed in a contact state between their hypotenuses. A polymer material may be coated on at least one the hypotenuses so as to reflect one of P and S waves and transmit the other.

A s shown in FIG. 13, light emitted from the plurality of light source assemblies 500 and 600 may be combined while passing through the polarization separator 700, which realizes high luminance of the projector.

With the configuration, second light sources may be disposed on a second plane spaced from a first plane where first light sources are present, and allowed to emit light between the first light sources. Accordingly, more light sources can be integrated within a limited space and a light source assembly with higher luminance and a projector having the same can be implemented.

The combination of polarized light in first and second directions may improve energy uniformity, thereby providing light sources with better qualities. In addition, power supplied to the first and second light sources can be individually controlled (supplied/blocked), thereby controlling the polarized light in the first and second directions, which results in implementation of a three-dimensional display even without a separate polarization element.

Also, as a heat transfer unit is disposed between lines where light sources are located, efficient cooling may be allowed even when more light sources are present within a limited space. Consequently, a projector with higher luminance can be implemented.

First and second light sources are disposed on plate-like bodies to overlap each other and heat transfer units can penetrate central portions of the plate-like bodies, resulting in more uniform heat distribution of the light sources aligned in a matrix configuration. Therefore, the present disclosure can employ a laser diode as a light source for a projector.

In addition, as a flexible circuit board is disposed to intersect with lines where light sources are formed, a light source assembly which can individually control the light sources and be modularized can be obtained.

The foregoing embodiments and advantages of the constructions and methods for the light source assembly and the projector having the same are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A light source assembly comprising:
a plurality of first light sources disposed on a first plane to emit light;
a plurality of second light sources disposed on a second plane, the second plane spaced apart from the first plane with a preset interval, wherein each second light source emits light between the adjacent first light sources;
a lens configured to concentrate light emitted from the plurality of first and second light sources;
a first body disposed on the first plane, and having a plurality of first accommodating recesses for accommodation of the plurality of first light sources, respectively; and
a second body disposed on the second plane, and having a plurality of second accommodating recesses for accommodation of the plurality of second light sources, respectively,
wherein the first body comprises a light-shielding material such that the light emitted from the second light sources is filtered out, and
wherein the first body further comprises through holes through which the light emitted from the second light sources pass.

2. The assembly of claim 1, wherein the plurality of first light sources emit polarized light in a first direction, and the plurality of second light sources emit polarized light in a second direction intersecting with the first direction.

3. The assembly of claim 2, wherein the plurality of second light sources are alternately present between the plurality of first light sources upon being projected onto the first plane.

4. The assembly of claim 2, wherein the second direction is perpendicular to the first direction.

5. The assembly of claim 1, wherein light emitted from the plurality of second light sources is disposed between pitches of light emitted from the plurality of first light sources on an incident surface of the lens.

6. The assembly of claim 1, further comprising a light guide unit present on a path of light emitted from the plurality of first and second light sources and configured to convert the light path to guide the light toward the lens.

7. The assembly of claim 6, wherein the light guide unit comprises a reflection layer inclined from the first plane by a preset angle.

8. The assembly of claim 6, wherein the light guide unit comprises:
a base alternately having parallel surfaces each in parallel to the first plane and incline surfaces each inclined from the first plane by a preset angle; and
reflection layers disposed to overlap the incline surfaces.

9. The assembly of claim 8, wherein each of the reflection layers extends in one direction to guide light emitted respectively from the plurality of first and second light sources.

10. The assembly of claim 8, wherein the reflection layer is a coated mirror coated on the incline surface or a mirror film attached onto the incline surface.

11. The assembly of claim 2, further comprising a controller configured to control power to be supplied to or blocked from the first and second light sources in an individual manner such that one of the polarized light in the first and second directions can be emitted from a light source concentrated via the lens.

12. The assembly of claim 1, further comprising; the first and second bodies disposed to face each other; and a heat transfer unit inserted into at least one of the first and second bodies, wherein the first light sources are mounted onto the first body along a plurality of first lines, and the second light sources are mounted onto the second body along a plurality of second lines overlapping the first lines,
wherein the heat transfer unit is disposed between at least one of the first and second lines to transfer heat generated from at least one of the first and second light sources.

13. The assembly of claim 12, wherein the heat transfer unit comprises first and second heat transfer members,
wherein the first heat transfer member is inserted into the first body to transfer heat generated from the first light sources, and located between the first lines such that light emitted from the second light sources can penetrate between the first light sources.

14. The assembly of claim 13, wherein the second heat transfer member is inserted into the second body to transfer heat generated from the second light sources.

15. The assembly of claim 14, wherein the first and second heat transfer members are disposed in parallel or perpendicular to each other.

16. The assembly of claim 12, wherein the heat transfer unit extends from the first body and is bent to be inserted into the second body.

17. The assembly of claim 12, wherein the heat transfer unit comprises:
an inserted portion inserted into at least one of the first and second bodies; and an extending portion extending from the inserted portion to the outside of at least one of the first and second bodies.

18. A projector comprising:

a light source assembly configured to transfer heat generated from a plurality of light sources;

an image generator configured to form an image using light incident from the light sources; and a projection lens configured to project an image output from the image generator in an extended state, wherein the light source assembly comprises:

a plurality of first light sources disposed on a first plane to emit light;

a plurality of second light sources disposed on a second plane, the second plane spaced apart from the first plane with a preset interval, wherein the plurality of second light sources emit light between the plurality of first light sources;

a lens configured to concentrate light emitted from the plurality of first and second light sources;

a first body disposed on the first plane, and having a plurality of first accommodating recesses for accommodation of the plurality of first light sources, respectively; and a second body disposed on the second plane, and having a plurality of second accommodating recesses for accommodation of the plurality of second light sources, respectively, wherein the first body comprises a light-shielding material such that the light emitted from the second light sources is filtered out, and wherein the first body further comprises through holes through which the light emitted from the second light sources pass.

\* \* \* \* \*